US012545114B2

(12) United States Patent
Xu et al.

(10) Patent No.: US 12,545,114 B2
(45) Date of Patent: Feb. 10, 2026

(54) MOTOR CONTROL SYSTEM AND VEHICLE

(71) Applicant: BYD COMPANY LIMITED, Guangdong (CN)

(72) Inventors: Luhui Xu, Shenzhen (CN); Yilong Yu, Shenzhen (CN); Zhiyong Du, Shenzhen (CN); Axi Qi, Shenzhen (CN); Guangming Yang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 328 days.

(21) Appl. No.: 17/896,853

(22) Filed: Aug. 26, 2022

(65) Prior Publication Data

US 2022/0410718 A1  Dec. 29, 2022

Related U.S. Application Data

(63) Continuation of application No. PCT/CN2021/077946, filed on Feb. 25, 2021.

(30) Foreign Application Priority Data

Feb. 26, 2020 (CN) .......................... 202010120914.7

(51) Int. Cl.
*B60L 3/00* (2019.01)
*B60L 15/20* (2006.01)
(Continued)

(52) U.S. Cl.
CPC ............. *B60L 3/0061* (2013.01); *B60L 15/20* (2013.01); *H02H 7/0833* (2013.01); *H02P 6/08* (2013.01); *B60L 2240/423* (2013.01)

(58) Field of Classification Search
None
See application file for complete search history.

(56) References Cited

U.S. PATENT DOCUMENTS 5,730,238 A    3/1998   Tamaki et al.
7,130,170 B2   10/2006  Wakefield
(Continued)

FOREIGN PATENT DOCUMENTS

CN    201022185 Y    2/2008
CN    101483404 A    7/2009
(Continued)

OTHER PUBLICATIONS

English Translation of International Search Report from PCT/CN2021/081357 dated Jun. 15, 2021 (2 pages).
(Continued)

*Primary Examiner* — James J Lee
*Assistant Examiner* — Melanie G Huber
(74) *Attorney, Agent, or Firm* — Calfee, Halter & Griswold LLP

(57) ABSTRACT

A motor control system and a vehicle. The motor control system includes: a vehicle control unit, configured to obtain vehicle state data and output an instruction for cutting off motor output torque when determining an unexpected power transmission failure according to the vehicle state data; and a motor controller unit, connected to the vehicle control unit, and configured to stop outputting motor control torque in response to the instruction for cutting off motor output torque.

18 Claims, 5 Drawing Sheets

(51) Int. Cl.
*H02H 7/08* (2006.01)
*H02P 6/08* (2016.01)

(56) References Cited

U.S. PATENT DOCUMENTS

| | | | | |
|---|---|---|---|---|
| 8,405,343 | B2* | 3/2013 | Sumida | B60L 3/003 |
| | | | | 361/600 |
| 9,463,697 | B1 | 10/2016 | Gauthier | |
| 2008/0111506 | A1 | 5/2008 | Muta et al. | |
| 2009/0167234 | A1* | 7/2009 | Uechi | H02M 1/32 |
| | | | | 180/65.285 |
| 2010/0121512 | A1* | 5/2010 | Takahashi | B60K 6/365 |
| | | | | 475/5 |
| 2012/0212251 | A1* | 8/2012 | Yanagishima | H03K 17/691 |
| | | | | 324/762.01 |
| 2014/0191700 | A1 | 7/2014 | Eberlein et al. | |
| 2016/0339949 | A1* | 11/2016 | Mori | H02P 29/032 |
| 2017/0272025 | A1 | 9/2017 | Jimbo et al. | |
| 2018/0034459 | A1* | 2/2018 | Lee | H03K 17/168 |
| 2018/0237021 | A1* | 8/2018 | Orita | B60W 10/10 |
| 2019/0131896 | A1* | 5/2019 | Kamio | F16H 61/32 |
| 2019/0190423 | A1* | 6/2019 | Kurokawa | H02P 29/024 |
| 2020/0139903 | A1* | 5/2020 | Kamio | B60L 3/0084 |

FOREIGN PATENT DOCUMENTS

| | | |
|---|---|---|
| CN | 201976054 U | 9/2011 |
| CN | 202685982 U | 1/2013 |
| CN | 103050944 A | 4/2013 |
| CN | 103863122 A | 6/2014 |
| CN | 106208884 A | 12/2016 |
| CN | 106708003 A | 5/2017 |
| CN | 107340762 A | 11/2017 |
| CN | 107342715 A | 11/2017 |
| CN | 108681318 A | 3/2018 |
| CN | 107878258 A | 4/2018 |
| CN | 207853453 U | 9/2018 |
| CN | 108621798 A | 10/2018 |
| CN | 108696226 A | 10/2018 |
| CN | 110620543 A | 10/2018 |
| CN | 109263482 A | 1/2019 |
| CN | 110525232 A | 12/2019 |
| CN | 209949004 U | 1/2020 |
| CN | 110768213 A | 2/2020 |
| CN | 110808571 A | 2/2020 |
| DE | 102013008770 B3 | 10/2014 |
| JP | 08318757 A | 12/1996 |
| JP | 2000102288 A | 4/2000 |
| JP | 2000166010 A | 6/2000 |
| JP | 2005161961 A | 6/2005 |
| JP | 2012060841 A | 3/2012 |
| JP | 2012205332 A | 10/2012 |
| JP | 2013132137 A | 7/2013 |
| JP | 2017169441 A | 9/2017 |
| WO | 0221675 A2 | 3/2002 |
| WO | 2002021675 A2 | 3/2002 |

OTHER PUBLICATIONS

English Translation of International Search Report from PCT/CN2021/077946 dated Apr. 14, 2021 (2 pages).

* cited by examiner

MOTOR CONTROL SYSTEM AND VEHICLE

CROSS-REFERENCE TO RELATED APPLICATIONS

The present disclosure is a bypass continuation application for International Application PCT/CN2021/077946, filed on Feb. 25, 2021, which claims priority to Chinese Patent Application No. "202010120914.7", entitled "MOTOR CONTROL SYSTEM AND VEHICLE" and filed by BYD Co., Ltd. on Feb. 26, 2020, which is incorporated herein by reference in its entirety.

FIELD

The present disclosure relates to a motor control system and a vehicle.

BACKGROUND

Currently, electrical vehicles develop rapidly. A power source of a pure electrical vehicle is basically motor drive, and a hybrid vehicle also has a motor drive system. In the application field of vehicles, for motor-driven control, functions and performance need to be considered, and safety and reliability need to be considered. In a design process of a motor controller unit, the motor controller unit is usually treated as a self-improving control system. A vehicle control unit (Vehicle control unit, VCU) mainly sends a torque enable and a torque instruction to the motor controller unit (Motor controller unit, MCU). The motor controller unit performs determination on a torque output and other instructions. A conventional topology structure of the motor drive system is shown in FIG. 1, and an architecture of a motor control system is shown in FIG. 2.

SUMMARY

A first aspect of the present disclosure is to provide a motor control system. The system includes: a vehicle control unit, configured to obtain vehicle state data and output an instruction for cutting off motor output torque when determining an unexpected power transmission failure of a vehicle according to the vehicle state data; and a motor controller unit, connected to the vehicle control unit, and configured to control a motor to stop outputting torque in response to the instruction for cutting off motor output torque.

A second aspect of the present disclosure is to provide a vehicle. The vehicle includes a motor and the motor control system mentioned above. The motor control system is configured to control the motor.

The additional aspects and advantages of the present disclosure will be set forth in part in the description which follows, parts of which will become apparent from the description below, or will be understood by the practice of the present disclosure.

BRIEF DESCRIPTION OF THE DRAWINGS

The foregoing and/or additional aspects and advantages of the present disclosure become obvious and easily understood in descriptions of the embodiments with reference to the following accompanying drawings.

DETAILED DESCRIPTION

Figure 1:
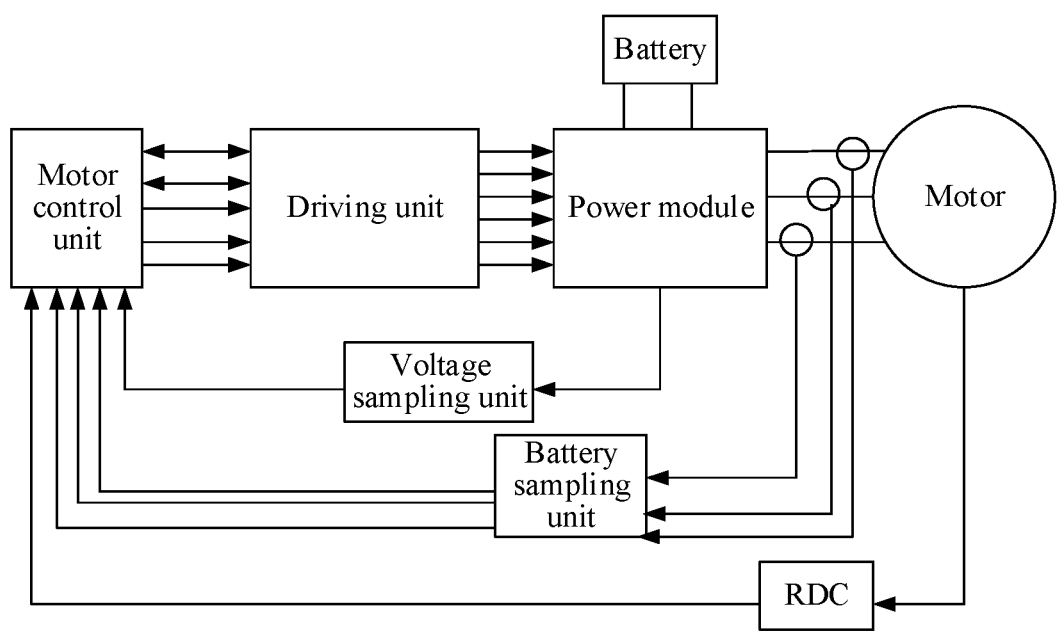
FIG. 1 is a schematic diagram of a conventional topology structure of a motor drive system in the related art.
Figure 2:
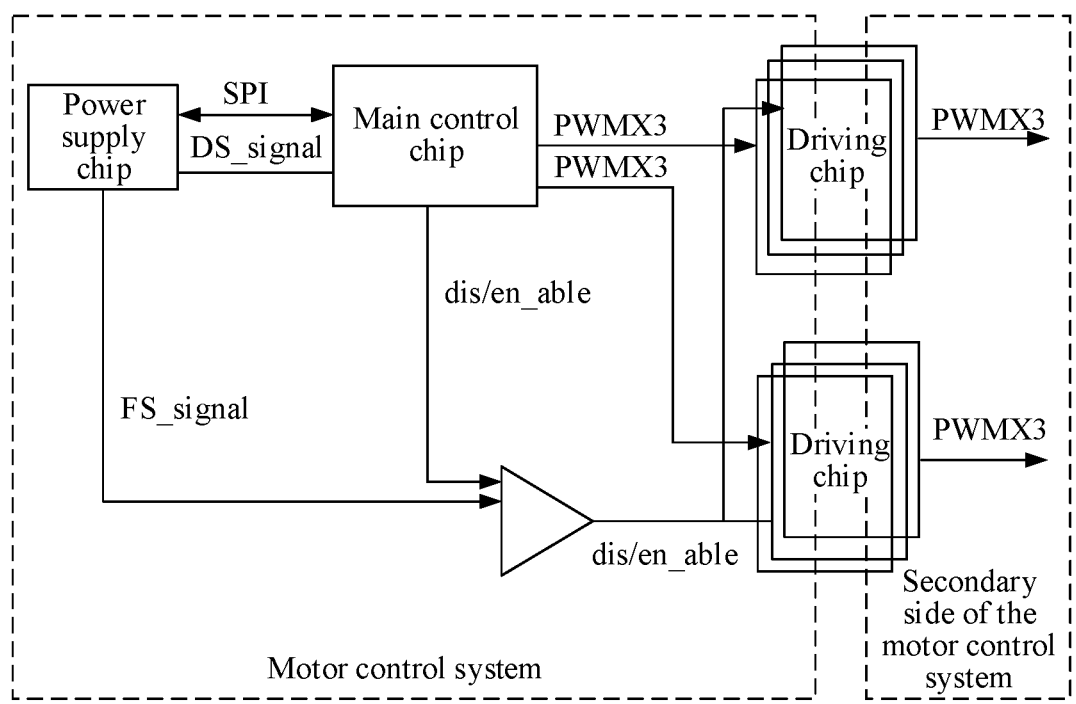
FIG. 2 is a schematic diagram of an architecture of a motor control system in the related art.

In the motor control system, to deal with the occurrence of an unexpected state, it is utterly required that a detection mechanism of a motor controller unit system should reach a higher safety level, and detection mechanisms and redundancy mechanisms are required, resulting in relatively high costs.

Detail description of embodiments of the present disclosure will be made in the following, and examples in the embodiments are illustrated in the accompanying drawings, throughout which identical or similar elements or elements of identical or similar functions are represented with identical or similar reference numerals. The following embodiments described with reference to the accompanying drawings are exemplary, and are intended to describe the present disclosure and cannot be construed as a limitation to the present disclosure.

A motor control system implemented in a first aspect of the embodiments of the present disclosure is described below with reference to FIG. 3 to FIG. 7.

Figure 3:
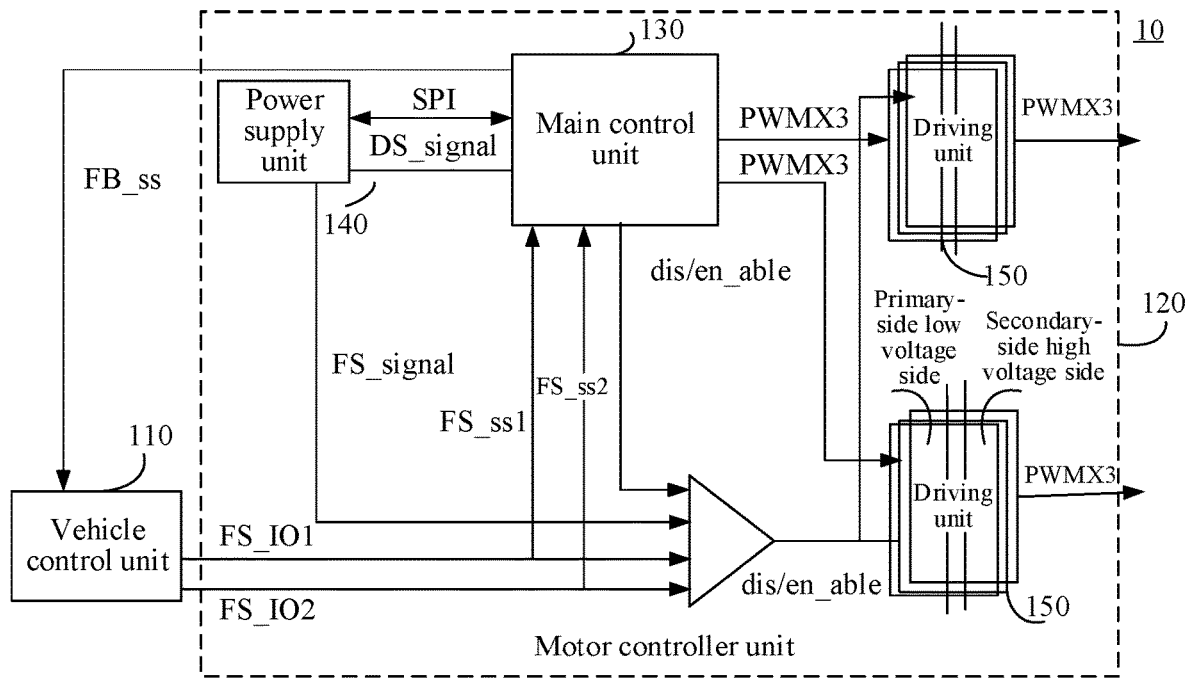
FIG. 3 is a schematic diagram of a motor control system according to an embodiment of the present disclosure.

As shown in FIG. 3, a motor control system 10 in the embodiments of the present disclosure includes a vehicle control unit 110 and a motor controller unit 120.

The vehicle control unit 110 is configured to obtain vehicle state data and output an instruction for cutting off motor output torque when determining an unexpected power output abnormality of a vehicle according to the vehicle state data. The motor controller unit 120 is connected to the vehicle control unit 110, and configured to control a motor to stop outputting torque in response to the instruction for cutting off motor output torque.

Specifically, the vehicle state data may include various operation detection data of a vehicle and failure data fed back by various components. For example, the vehicle control unit 110 may obtain, through a vehicle bus, information of various sensors such as an acceleration sensor of the vehicle, and smart detection data such as radar detection data and millimeter wave detection data. In addition, the failure data of the vehicle includes, for example, failure data of the motor controller unit 120 and failure data of a steering controller. When determining the unexpected power output abnormality such as an unexpected acceleration or an inconsistency between an operation state and power driving or an unexpected power driving state according to the obtained vehicle state data, the vehicle control unit 110 outputs the instruction for cutting off motor output torque. After receiving the instruction, the motor controller unit 120 may directly cut off a torque output path of the motor controller unit. In this case, the motor controller unit 120 enters a safe state, so as to ensure the safety of the power output of the vehicle, so that the motor control system 10 is more reliable. Compared with a conventional vehicle control system, the vehicle control unit 110 is added, so that the output of motor control torque is stopped when an unexpected failure occurs in the vehicle, thereby enabling the motor controller unit 120 to enter the safe state to ensure the safe operation of the vehicle. In this way, irreversible damage caused to the motor control system 10 when the motor controller unit 120 cannot normally detect a failure such as an unexpected acceleration can be avoided.

In the motor control system 10 according to the embodiments of the present disclosure, the safety of a vehicle is improved by strengthening the control of the vehicle control unit 110 over the motor controller unit 120. The vehicle control unit 110 outputs the instruction for cutting off motor output torque when determining an unexpected power transmission failure by making full use of the vehicle state data, and stops outputting motor control torque after the motor controller unit 120 receives the instruction, so as to enter a safe motor control state, thereby avoiding damage to the motor controller unit 120 because the motor controller unit 120 cannot detect an unexpected state failure, thereby increasing the safe operation time and operation reliability of the vehicle.

In some embodiments, the vehicle control unit 110 may send the instruction for cutting off motor output torque through a CAN bus, or the vehicle control unit 110 transmits the instruction for cutting off motor output torque to the motor controller unit 120 through a hard wire, that is, directly transmits a control signal to the motor controller unit 120 through the hard wire. Transmission through the hard wire is relative high in safety and timeliness, making it convenient to output the instruction of cutting off torque in time when a driving failure is determined, so that the motor controller unit 120 enters the safe state as soon as possible, thereby making the motor control system 10 of the vehicle more reliable.

Figure 4:
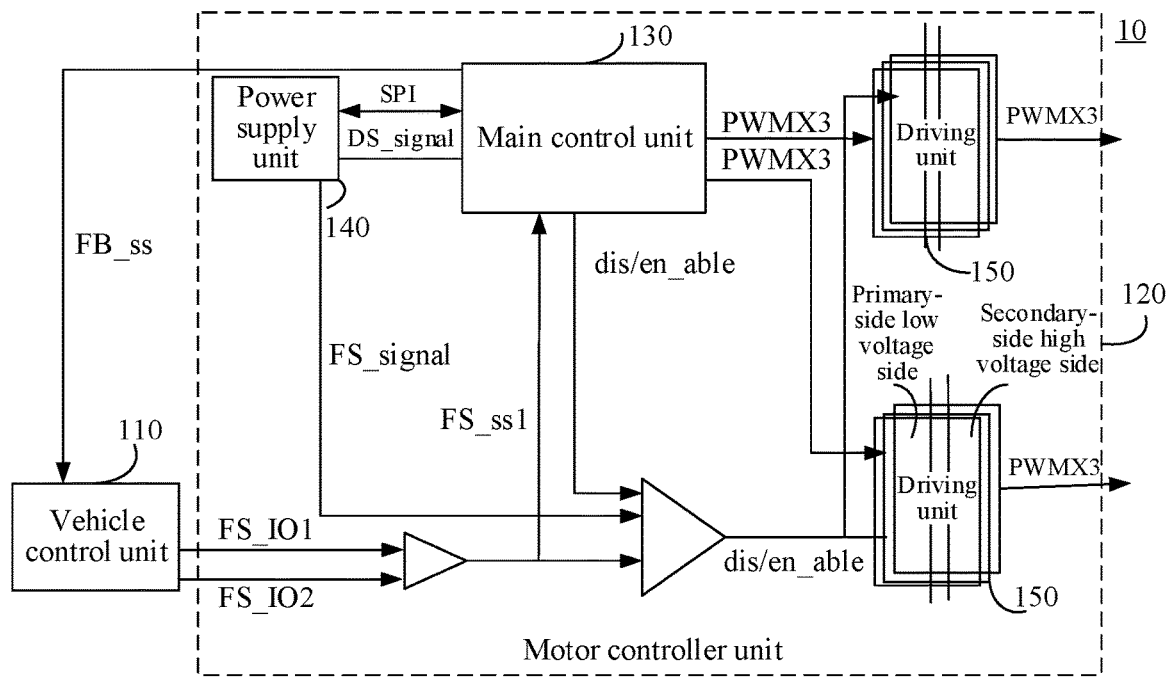
FIG. 4 is a schematic diagram of a motor control system according to another embodiment of the present disclosure.

In some embodiments, as shown in FIG. 3 or FIG. 4, the motor controller unit 120 includes a main control unit 130, a power supply unit 140, and a driving unit 150. The main control unit 130 is configured to perform main function operation on motor control. The power supply unit 140 is configured to supply power to the motor control system at a low voltage. The driving unit 150 is configured to convert a driving signal. That is, the driving unit 150 is configured to convert a signal from the main control unit 130 into a signal that can drive a power module. A connection relationship between the main control unit 130, the power supply unit 140, and the driving unit 150 is shown in FIG. 3 or FIG. 4.

The driving unit 150 includes a primary-side low voltage side and a secondary-side high voltage side. As shown in FIG. 3, the instruction for cutting off motor output torque from the vehicle control unit 110 may be transmitted to the primary-side low voltage side of the driving unit 150. A safe cut-off signal from the power supply unit 140 and an enable cut-off signal from the main control unit 130 are transmitted to the primary-side low voltage side of the driving unit 150. The instruction for cutting off motor output torque from the vehicle control unit 110 and the signals from the power supply unit 140 and the main control unit 130 form the driving unit 150 that controls the power module through an enable path.

Specifically, as shown in FIG. 3, a logical OR operation is performed on the instruction for cutting off motor output torque, for example, signals FS_IO1 and FS_IO2, outputted by the vehicle control unit 110, the safe cut-off signal, for example, FS_signal, outputted by the power supply unit 140, and the enable cut-off signal, for example, dis/en_able, outputted by the main control unit 130. The driving unit 150 stops outputting a motor control torque signal when receiving any of the instruction for cutting off motor output torque, the safe cut-off signal, or the enable cut-off signal, so that the motor control system 10 enters the safe state.

The main control unit 130 is configured to obtain motor state data such as a voltage, a current, or a rotation angle, and output the enable cut-off signal when determining that motor operation is abnormal according to the motor state data. The driving unit 150 stops outputting motor control torque when receiving any of the enable cut-off signal or the instruction for cutting off motor output torque, so that the motor enters the safe state.

The power supply unit 140 in the motor controller unit 120 may also monitor a state of the main control unit 130, and outputs the safe cut-off signal when the power supply unit 140 or the main control unit 130 is abnormal, and may also cut off a torque output of the motor controller unit 120.

When detecting that an unexpected control state such as an unexpected acceleration occurs in the vehicle, the vehicle control unit 110 may also output the safe cut-off signal, so as to safely cut off a driving path. The vehicle control unit 110 controls a cut-off path through a primary-side control circuit in the motor controller unit 120, so that an electrical drive system enters the safe state.

Figure 5:
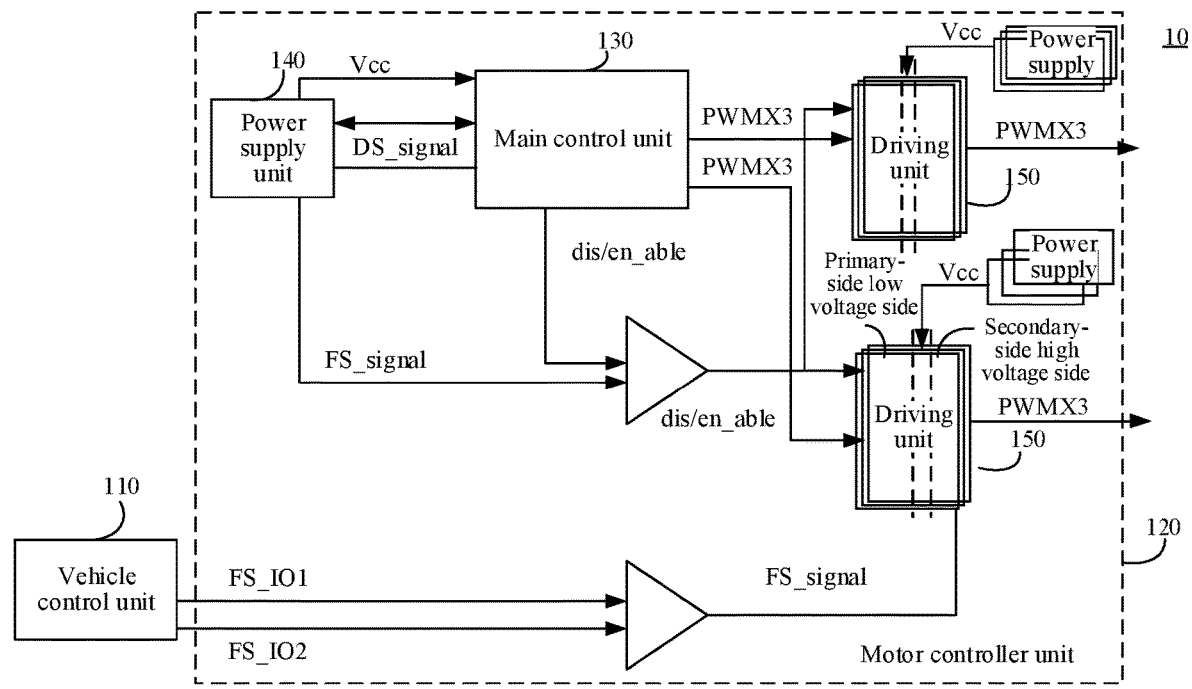
FIG. 5 is a schematic diagram of a motor control system according to an embodiment of the present disclosure.

In some embodiments, as shown in FIG. 5, the instruction for cutting off motor output torque from the vehicle control unit 110 may be transmitted to the secondary-side high voltage side of the driving unit 150.

Specifically, the driving unit 150 in a driving board can be directly controlled by transmitting the instruction for cutting off motor output torque, for example, the signals FS_IO1 and FS_IO2, outputted by the vehicle control unit 110 to the secondary-side high voltage side of the driving unit 150.

In the embodiments, a feedback channel may be provided between the main control unit 130 and the vehicle control unit 110. The motor controller unit 120 may monitor a hardwired control information state of the vehicle control unit 110 and feed back the hardwired control information state to the vehicle control unit 110. Specifically, the vehicle control unit 110 sends the instruction for cutting off motor output torque to the main control unit 130 through the CAN bus or the hard wire. Then the main control unit 130 feeds back the received instruction for cutting off motor output torque to the vehicle control unit 110 through the feedback channel. The feedback channel may include a CAN communication channel or a hardwire connection channel. The vehicle control unit 110 determines correctness of sent information according to the instruction for cutting off motor output torque fed back by the main control unit 130.

As shown in FIG. 3, a signal Fb_ss is the feedback channel between the main control unit 130 of the motor controller unit 120 and the vehicle control unit 110, may be a CAN communication channel or may be a hardwired feedback channel, and is preferably a CAN communication channel. FS_ss1 and FS_ss2 are feedback paths of FS_IO1 and FS_IO2 of the vehicle control unit 110 respectively. The safe cut-off signal from the vehicle control unit 110 is fed back to the main control unit 130. Then the main control unit 130 feeds back the received safe cut-off signal to the vehicle control unit 110. After receiving the safe cut-off signal fed back by the main control unit 130, the vehicle control unit 110 identifies whether the signal is correct. If the signal is correct, the information sent by the vehicle control unit 110 is correct, or otherwise, there is an error in the information sent by the vehicle control unit 110. In this way, an objective of monitoring the sent information can be achieved, thereby improving the accuracy and safety of the information sent by the vehicle control unit 110. In some other embodiments, as shown in FIG. 4, the feedback paths of FS_ss1 and FS_ss2 may be combined into one path FS_ss1 for control and feedback. Through a signal feedback between the main control unit 130 and the vehicle control unit 110, the vehicle control unit 110 can monitor transmission data, so as to ensure the correctness and stability of the transmission data.

In the embodiments, as shown in FIG. 3, or FIG. 4, or FIG. 5, two groups of driving units 150 are provided. Each group of driving units 150 includes three driving subunits. The three driving subunits of one group of driving units 150 are configured to control three power modules of an upper bridge arm, and the three driving subunits of another group of driving units 150 are configured to control three power modules of a lower bridge arm.

As shown in FIG. 5, one group of driving units 150 is powered by a first power supply source, and another group of driving units 150 is powered by a second power supply source. That is, the driving units 150 are all powered by independent power supplies. That is, the driving units 150 supply power to three-phase upper and lower bridge arms through two independent power supply sources Vcc, so as to ensure the operation reliability of the driving board. Each of the vehicle control unit 110, a main control part, that is, the main control unit 130 of the motor controller unit 120, and the power supply unit 140 can independently control the driving unit 150, to enable the motor controller unit 120 to enter the safe state. Certainly, the two groups of driving units 150 may be powered by the same power supply source.

The main control unit 130 is configured to obtain the motor state data and output the enable cut-off signal when determining that motor operation is abnormal according to the motor state data. The driving unit 150 is configured to control the motor to stop outputting torque when receiving any of the enable cut-off signal or the instruction for cutting off motor output torque.

In addition, the power supply unit 140 in the motor controller unit 120 monitors the state of the main control unit 130, and outputs the safe cut-off signal when the power supply unit 140 or the main control unit 130 is abnormal. The power supply unit 140 may also cut off safe driving, to switch the driving unit 150 to a safe path.

When detecting an unexpected power transmission state such as an unexpected acceleration in the vehicle, the vehicle control unit 110 may directly control the driving unit 150 to output the safe cut-off signal, so as to safely cut off the driving path and enter a safe state of the electrical drive system.

Instead of controlling the cut-off path through the primary-side control circuit in the motor controller unit 120, the vehicle control unit 110 can directly control a secondary-side control circuit in the motor controller unit 120, so as to enable the electrical drive system to enter the safe state. The motor controller unit 120 and the vehicle control unit 110 can independently control the driving unit 150, so as to enable electrical driving to enter the safe state.

Figure 6:
FIG. 6 is a schematic diagram of a redundant transmission signal of a cut-off path of a vehicle control unit according to an embodiment of the present disclosure.

In some embodiments, the instruction for cutting off motor output torque transmitted by the vehicle control unit 110 is a redundant signal and the same level signals are used. As shown in FIG. 6, two same level signals are used to ensure the reliability of the signal.

In some embodiments, the instruction for cutting off motor output torque transmitted by the vehicle control unit 110 is a bistable signal and opposite level signals are used.

Figure 7:
FIG. 7 is a schematic diagram of a bistable transmission signal from a cut-off path of a vehicle control unit according to an embodiment of the present disclosure.

As shown in FIG. 7, two opposite level signals are used, and common-mode signal interference can be reduced through differentiation of the signal, so as to ensure the reliability of the signal. Alternatively, the instruction for cutting off motor output torque may be a CAN signal, or another multi-channel redundant signal.

In the motor control system 10 according to the embodiments of the present disclosure, the safety of a vehicle is improved by strengthening the control of the vehicle control unit 110 over the motor controller unit 120. The vehicle control unit 110 outputs the instruction for cutting off motor output torque when determining an unexpected power transmission failure by making full use of vehicle state information, and stops outputting motor control torque after the motor controller unit 120 receives the instruction, so as to enter a safe motor control state, thereby avoiding damage to the motor controller unit 120 because the motor controller unit 120 cannot detect an unexpected state failure, thereby increasing the safe operation time and operation reliability of the vehicle.

A vehicle according to an embodiment of a second aspect of the present disclosure is described below with reference to the accompanying drawings.

Figure 8:
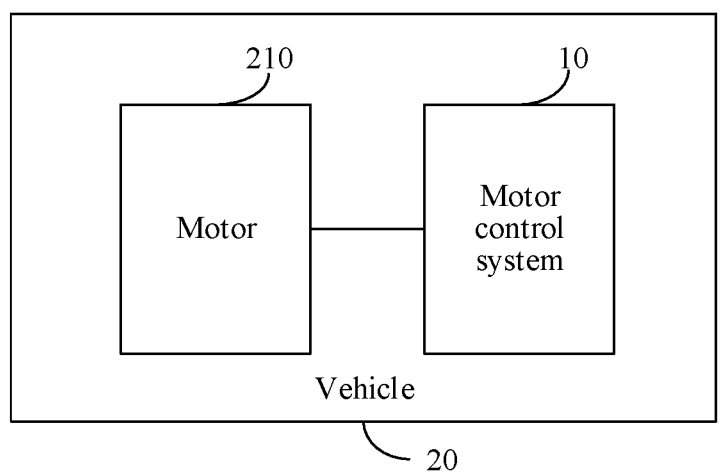
FIG. 8 is a block diagram of a vehicle according to an embodiment of the present disclosure.

FIG. 8 is a block diagram of a vehicle 20 according to an embodiment of a fourth aspect of the present disclosure. The vehicle 20 according to this embodiment of the present disclosure shown in FIG. 8 includes a motor 210 and the motor control system 10 mentioned in the above embodiments. The motor control system 10 is configured to control the motor. For a specific control path, reference may be made to the descriptions of the above embodiments.

In the vehicle 20 according to this embodiment of the present disclosure, the motor 210 is controlled through the motor control system 10 of the above embodiments, which can improve the operation safety and reliability of the vehicle 20.

In the description of the present disclosure, it should be understood that, orientations or position relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counter-clockwise", "axial", "radial", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure.

In addition, terms "first" and "second" are used only for describing objectives, and shall not be construed as indicating or implying relative importance or implying a quantity of indicated technical features. Therefore, features defining "first" and "second" may explicitly or implicitly include one or more such features. In the descriptions of the present disclosure, unless otherwise specified, "multiple" means two or more than two.

In the present disclosure, unless otherwise clearly specified and limited, terms "mount", "connected", "connection" and "fix" should be understood in a generalized manner, for example, may be understood as fixed connection, detachable connection, or integration; or may be understood as mechanical connection or electrical connection; or may be understood as direct connection, or indirect connection through a medium, or internal communication of two elements or a mutual relationship between two elements. A person of ordinary skill in the art can understand specific meanings of the foregoing terms in the present disclosure according to a specific situation.

In the present disclosure, unless explicitly specified or limited otherwise, a first characteristic "on" or "under" a second characteristic may be the first characteristic in direct contact with the second characteristic, or the first characteristic in indirect contact with the second characteristic by using an intermediate medium. Moreover, the first feature "on", "above" and "on the top of" the second feature may be that the first feature is directly above or obliquely above the second feature, or merely that the level of the first feature level is higher than that of the second feature. That the first feature is "below", "under", and "beneath" the second feature may be that the first feature is directly below or obliquely below the second feature, or may merely indicate that the horizontal position of the first feature is lower than that of the second feature.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of the present disclosure. In this specification, exemplary descriptions of the foregoing terms do not necessarily refer to a same embodiment or example. Moreover, the specific features, structures, materials, or characteristics described may be combined in any one or more embodiments or examples in a suitable manner. In addition, different embodiments or examples described in the present specification, as well as features of different embodiments or examples, may be integrated and combined by those skilled in the art without contradicting each other.

Although the embodiments of the present disclosure have been shown and described above, it can be understood that, the foregoing embodiments are exemplary and should not be understood as limitation to the present disclosure. A person of ordinary skill in the art can make changes, modifications, replacements, or variations to the foregoing embodiments within the scope of the present disclosure.

What is claimed is:

1. A motor control system, comprising:
a vehicle controller, configured to obtain vehicle state data and output an instruction for cutting off motor output torque when determining an unexpected power output abnormality of a vehicle according to the vehicle state data; and
a motor controller, that is separate from and connected to the vehicle controller by one of a hard wire and a CAN bus, and configured to control a motor to stop outputting torque in response to the instruction for cutting off motor output torque;
wherein the motor controller comprises a main control chip, a power supply chip, and a driving chip;
wherein the driving chip comprises a primary-side low voltage side and a secondary-side high voltage side;
wherein at least the primary-side low voltage side is configured to receive the instruction for cutting off motor output torque from the vehicle controller and to stop the motor from outputting torque based on the instruction;
wherein the one of the hard wire and the CAN bus defines a feedback channel between the vehicle controller and the main control chip; and
wherein the vehicle controller sends the instruction for cutting off motor output torque to the main control chip, the main control chip feeds back the received instruction for cutting off motor output torque to the vehicle controller through the feedback channel, and the vehicle controller determines correctness of sent information according to the instruction for cutting off motor output torque fed back by the main control chip.

2. The motor control system according to claim 1, wherein the main control chip is configured to obtain motor state data and output an enable cut-off signal when determining that motor operation is abnormal according to the motor state data; and
the driving chip is configured to control the motor to stop outputting torque when receiving any of the enable cut-off signal or the instruction for cutting off motor output torque.

3. The motor control system according to claim 2, wherein the power supply chip is configured to monitor a state of the main control chip and output a safe cut-off signal when the main control chip or the power supply chip is abnormal,
the safe cut-off signal from the power supply chip and the enable cut-off signal from the main control chip are transmitted to the primary-side low voltage side of the driving chip, and
the driving chip controls the motor to stop outputting torque when receiving any of the instruction for cutting off motor output torque, the safe cut-off signal, or the enable cut-off signal.

4. The motor control system according to claim 1, wherein two groups of driving chips are provided, each group of driving chips comprises three driving controllers, the three driving controllers of one group of driving chips are configured to control three power modules of an upper bridge arm, and the three driving controllers of another group of driving chips are configured to control three power modules of a lower bridge arm.

5. The motor control system according to claim 4, wherein one group of driving chips is powered by a first power supply source, and another group of driving chips is powered by a second power supply source; or the two groups of driving chips are powered by the same power supply source.

6. The motor control system according to claim 1, wherein the instruction for cutting off motor output torque transmitted by the vehicle controller is a redundant signal and the same level signals are used, or the instruction for cutting off motor output torque transmitted by the vehicle controller is a bistable signal and opposite level signals are used.

7. A vehicle, comprising a motor and the motor control system according to claim 1, wherein the motor control system is configured to control the motor.

8. The motor control system according to claim 1, wherein the secondary-side high voltage side is configured to receive the instruction for cutting off motor output torque from the vehicle controller and to stop the motor from outputting torque based on the instruction.

9. The motor control system according to claim 8, wherein the main control chip is configured to obtain motor state data and output an enable cut-off signal when determining that motor operation is abnormal according to the motor state data; and
the driving chip is configured to control the motor to stop outputting torque when receiving any of the enable cut-off signal or the instruction for cutting off motor output torque.

10. The motor control system according to claim 9, wherein the power supply chip is configured to monitor a state of the main control chip and output a safe cut-off signal when the main control chip or the power supply chip is abnormal, the safe cut-off signal from the power supply chip and the enable cut-off signal from the main control chip are transmitted to the primary-side low voltage side of the driving chip, and the driving chip controls the motor to stop outputting torque when receiving any of the instruction for cutting off motor output torque, the safe cut-off signal, or the enable cut-off signal.

11. The motor control system according to claim 10, wherein two groups of driving chips are provided, each group of driving chips comprises three driving chip portions, the three driving chip portions of one group of driving chips are configured to control three power modules of an upper bridge arm, and the three driving chip portions of another group of driving chips are configured to control three power modules of a lower bridge arm.

12. The motor control system according to claim 11, wherein
one group of driving chips is powered by a first power supply source, and another group of driving chips is powered by a second power supply source; or the two groups of driving chips are powered by the same power supply source.

13. The motor control system according to claim 12, wherein the instruction for cutting off motor output torque transmitted by the vehicle controller is a redundant signal and the same level signals are used, or the instruction for cutting off motor output torque transmitted by the vehicle controller is a bistable signal and opposite level signals are used.

14. The motor control system according to claim 1, wherein the one of the hard wire and the CAN bus is a CAN bus.

15. A motor control system, comprising:
a vehicle control unit, configured to obtain vehicle state data and output an instruction for cutting off motor output torque when determining an unexpected power output abnormality of a vehicle according to the vehicle state data; and
a motor controller unit, that is separate from and connected to the vehicle control unit by one of a hard wire and a CAN bus, and configured to control a motor to stop outputting torque in response to the instruction for cutting off motor output torque;
wherein the motor controller unit comprises a main control unit, a power supply unit, and a driving unit;
wherein the driving unit comprises a primary-side low voltage side;
wherein at least the primary-side low voltage side is configured to receive the instruction for cutting off motor output torque from the vehicle controller and to stop the motor from outputting torque based on the instruction;
wherein the one of the hard wire and the CAN bus defines a feedback channel between the vehicle control unit and the main control unit; and
wherein the vehicle control unit sends the instruction for cutting off motor output torque to the main control unit, the main control unit feeds back the received instruction for cutting off motor output torque to the vehicle control unit through the feedback channel, and the vehicle control unit determines correctness of sent information according to the instruction for cutting off motor output torque feedback by the main control unit.

16. The motor control system according to claim 15, wherein the one of the hard wire and the CAN bus is a CAN bus.

17. A motor control system, comprising:
means for obtaining vehicle state data and outputting an instruction for cutting off motor output torque when determining an unexpected power output abnormality of a vehicle according to the vehicle state data; and
means for controlling a motor to stop outputting torque in response to the instruction for cutting off motor output torque;
wherein the means for controlling the motor is separate from and connected to the means for obtaining vehicle state data by one of a hard wire and a CAN bus, and further comprises means for receiving the instruction for cutting off motor output torque at least on a primary-side low voltage and for stopping the motor from outputting torque based on the instruction; and
means for feeding back the received instruction to cut off motor output torque as feedback to the means for obtaining vehicle state data through a feedback channel defined by the one of the hard wire and the CAN bus;
wherein the means for obtaining vehicle state data is further configured to determine correctness of the sent instruction based on the feedback.

18. The motor control system according to claim 17, wherein the one of the hard wire and the CAN bus is a CAN bus.

* * * * *